United States Patent
Lee et al.

(10) Patent No.: US 8,615,021 B2
(45) Date of Patent: Dec. 24, 2013

(54) METHOD AND APPARATUS TO MULTIPLEX AND DEMULTIPLEX ASYNCHRONOUS BITSTREAMS

(75) Inventors: Kang-eun Lee, Yongin-si (KR); Ki-hyun Choo, Yongin-si (KR); Jung-hoe Kim, Yongin-si (KR); Eun-mi Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/417,419

(22) Filed: Mar. 12, 2012

(65) Prior Publication Data
US 2012/0170595 A1    Jul. 5, 2012

Related U.S. Application Data

(63) Continuation of application No. 11/935,631, filed on Nov. 6, 2007, now Pat. No. 8,134,910.

(30) Foreign Application Priority Data

Apr. 11, 2007  (KR) .................. 10-2007-0035729

(51) Int. Cl.
*H04J 3/16*  (2006.01)

(52) U.S. Cl.
USPC ...................................................... 370/470

(58) Field of Classification Search
USPC ......... 370/203, 204–215, 216–228, 229–240, 370/241–253, 254–271, 310–337, 338–350, 370/395.3, 395.4, 395.41, 395.42, 395.5, 370/395.52, 431–457, 458–463, 464–497, 370/498–522, 523–520, 521–529
See application file for complete search history.

(56) References Cited

U.S. PATENT DOCUMENTS

| | | | | |
|---|---|---|---|---|
| 5,802,068 A | * | 9/1998 | Kudo | 370/538 |
| 5,822,321 A | * | 10/1998 | Petersen et al. | 370/474 |
| 6,009,108 A | * | 12/1999 | Takehara et al. | 370/538 |
| 6,157,674 A | * | 12/2000 | Oda et al. | 375/240 |
| 6,172,988 B1 | * | 1/2001 | Tiernan et al. | 370/473 |
| 6,185,229 B1 | * | 2/2001 | Obikane et al. | 370/537 |
| 6,233,253 B1 | * | 5/2001 | Settle et al. | 370/474 |
| 6,421,359 B1 | * | 7/2002 | Bennett et al. | 370/538 |
| 6,711,182 B1 | * | 3/2004 | Gibbs et al. | 370/537 |
| 7,224,703 B2 | * | 5/2007 | Antal et al. | 370/473 |
| 7,292,530 B2 | * | 11/2007 | Christensen | 370/230.1 |
| 7,369,488 B2 | * | 5/2008 | Nagao et al. | 370/216 |
| 7,457,525 B2 | * | 11/2008 | Matsuura et al. | 386/337 |
| 7,483,447 B2 | * | 1/2009 | Chang et al. | 370/469 |
| 2003/0161351 A1 | * | 8/2003 | Beverly et al. | 370/535 |
| 2005/0238057 A1 | * | 10/2005 | Toma et al. | 370/503 |

* cited by examiner

*Primary Examiner* — Jung-Jen Liu

(74) *Attorney, Agent, or Firm* — Stanzione & Kim, LLP

(57) ABSTRACT

Provided is a method and apparatus to multiplex bitstreams that are coded to have different frame lengths using asynchronous time alignment, in which, based on the length of each frame of a bitstream selected as a reference bitstream from among bitstreams coded to have different frame lengths by a plurality of coders, the remaining bitstreams except for the reference bitstream are divided and multiplexed.

18 Claims, 10 Drawing Sheets

METHOD AND APPARATUS TO MULTIPLEX AND DEMULTIPLEX ASYNCHRONOUS BITSTREAMS

CROSS-REFERENCE TO RELATED APPLICATIONS

This application is a Continuation Application of prior application Ser. No. 11/935,631, filed on Nov. 6, 2007 in the United States Patent and Trademark Office, which claims the benefit of Korean Patent Application No. 10-2007-0035729, filed on Apr. 11, 2007, in the Korean Intellectual Property Office, the disclosure of which is incorporated herein in their entirety by reference.

BACKGROUND OF THE INVENTION

1. Field of the Invention

The present invention relates to a method and apparatus to multiplex a plurality of bitstreams, and more particularly, to a method and apparatus to multiplex bitstreams that are coded to have different frame lengths using asynchronous time alignment.

2. Description of the Related Art

As illustrated in FIG. 1, a multiplexing unit 120 multiplexes bitstreams coded by an A coder 100 and a B coder 110 that use different coding methods and outputs a stream. For example, the A coder 100 codes an audio signal using Advanced Audio Coding (AAC), the B coder 110 codes an audio signal corresponding to a multi-channel using Moving Picture Experts Group (MPEG) Surround, and the multiplexing unit 120 multiplexes the audio signals coded using different coding methods.

When the A coder 100 and the B coder 110 codes the bitstreams using different coding methods, the multiplexing unit 120 may use synchronous time alignment in which the length of each frame of the bitstream coded by the A coder 100 may be the same as that of the bitstream coded by the B coder 110, as illustrated in FIG. 2 or use asynchronous time alignment in which the frame length of the bitstream coded by the A coder 100 may be different from that of the bitstream coded by the B coder 110, as illustrated in FIG. 3.

When the multiplexing unit 120 multiplexes the coded bitstreams using asynchronous time alignment, it selects one of the A coder 100 and the B coder 110, and divides the bitstream coded by the selected coder on a frame basis and divides the bitstream coded by the non-selected coder based on a predetermined criterion for multiplexing. Since a decoding end cannot recognize information related to the size of data obtained by dividing the bitstream coded by the non-selected coder, the multiplexing unit 120 inserts length information of data obtained by dividing the bitstream coded by the non-selected coder. For example, when the multiplexing unit 120 generates a stream by multiplexing the bitstreams that are coded to have different frame lengths by the A coder 100 and the B coder 110, as illustrated in FIG. 4, it divides a bitstream corresponding to an $(m-1)^{th}$ frame 300 coded by the A coder 100 into a bitstream corresponding to a first $(m-1)^{th}$ frame 303 and a bitstream corresponding to a second $(m-1)^{th}$ frame 306 and inserts $(n-2)^{th}$ length information 330 for the bitstream corresponding to the first $(m-1)^{th}$ frame 303 and $(n-1)^{th}$ length information 335 for the bitstream corresponding to the second $(m-1)^{th}$ frame 306 in order to enable a decoding end to recognize the length of the bitstream corresponding to the first $(m-1)^{th}$ frame 303 and the length of the bitstream corresponding to the second $(m-1)^{th}$ frame 306.

However, when length information of each bitstream divided in a coding end is inserted and multiplexed, length information has to be generated for every bitstream and has to be inserted into a stream for transmission to the decoding end, making a coding process complex and time-consuming and increasing the size of data to be transmitted from the encoder to the decoding end.

If a frame length with respect to the B coder 110 is much different from a frame length with respect to the A coder 100 as illustrated in FIG. 5, a bitstream corresponding to a unit frame coded by the A coder 100 is divided into numerous bitstreams. As a result, the number of pieces of length information for the divided bitstreams that are to be inserted and the size of data that is to be inserted excessively increases.

SUMMARY OF THE INVENTION

The present invention provides a method and apparatus in which, based on the length of each frame of a reference bitstream from among bitstreams coded to have different frame lengths by a plurality of coders, the remaining bitstreams are divided and then multiplexed.

The present invention also provides a method and apparatus, in which a stream generated by multiplexing bitstreams coded to have different frame lengths by a plurality of coders in a coding end is demultiplexed in order to detect the length of each frame of a reference bitstream and the remaining bitstreams are extracted using the detected length of each frame of the reference bitstream.

Additional aspects and utilities of the present general inventive concept will be set forth in part in the description which follows and, in part, will be obvious from the description, or may be learned by practice of the general inventive concept.

According to one aspect of the present invention, there is provided a method of multiplexing asynchronous bitstreams. The method includes detecting the length of each frame of a bitstream selected as a reference bitstream from among bitstreams that are coded to have different frame lengths by a plurality of coders, dividing the remaining bitstreams except for the reference bitstream based on the detected length of each frame, and multiplexing the reference bitstream and the divided bitstreams.

According to another aspect of the present invention, there is provided a method of demultiplexing asynchronous bitstreams. The method includes demultiplexing a stream generated by multiplexing bitstreams that are coded to have different frame lengths by a plurality of coders, detecting the length of each frame of a bitstream selected as a reference bitstream in the demultiplexed stream, and extracting the remaining divided bitstreams except for the reference bitstream using the detected length of each frame.

According to another aspect of the present invention, there is provided a computer-readable recording medium having recorded thereon a program to execute a method of multiplexing asynchronous bitstreams. The method includes detecting the length of each frame of a bitstream selected as a reference bitstream from among bitstreams that are coded to have different frame lengths by a plurality of coders, dividing the remaining bitstreams except for the reference bitstream based on the detected length of each frame, and multiplexing the reference bitstream and the divided bitstreams.

According to another aspect of the present invention, there is provided a computer-readable recording medium having recorded thereon a program to execute a method of demultiplexing asynchronous bitstreams. The method includes demultiplexing a stream generated by multiplexing bitstreams that are coded to have different frame lengths by a plurality of coders, detecting the length of each frame of a bitstream selected as a reference bitstream in the demultiplexed stream, and extracting the remaining divided bitstreams except for the reference bitstream using the detected length of each frame.

According to another aspect of the present invention, there is provided an apparatus to multiplex asynchronous bitstreams. The apparatus includes a frame length detection unit detecting the length of each frame of a bitstream selected as a reference bitstream from among bitstreams that are coded to have different frame lengths by a plurality of coders, a division unit dividing the remaining bitstreams except for the reference bitstream based on the detected length of each frame, and a multiplexing unit multiplexing the reference bitstream and the divided bitstreams.

According to another aspect of the present invention, there is provided an apparatus to demultiplex asynchronous bitstreams. The apparatus includes a demultiplexing unit demultiplexing a stream generated by multiplexing bitstreams that are coded to have different frame lengths by a plurality of coders, a length detection unit detecting the length of each frame of a bitstream selected as a reference bitstream in the demultiplexed stream, and an extraction unit extracting the remaining divided bitstreams except for the reference bitstream using the detected length of each frame.

BRIEF DESCRIPTION OF THE DRAWINGS

The above and other features and advantages of the present invention will become more apparent by describing in detail an exemplary embodiment thereof with reference to the attached drawings in which.

DETAILED DESCRIPTION OF THE PREFERRED EMBODIMENTS

Figure 1:
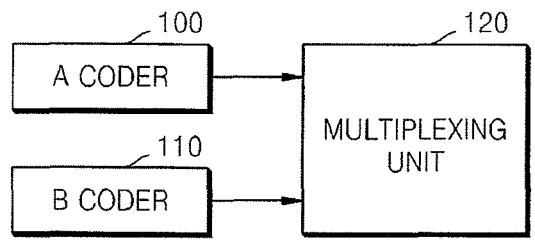
FIG. 1 is a block diagram of a conventional apparatus to multiplex bitstreams.
Figure 2:
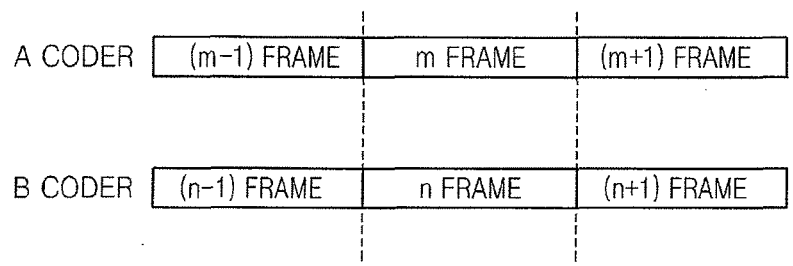
FIG. 2 is a conceptual view for explaining synchronous time alignment.
Figure 3:
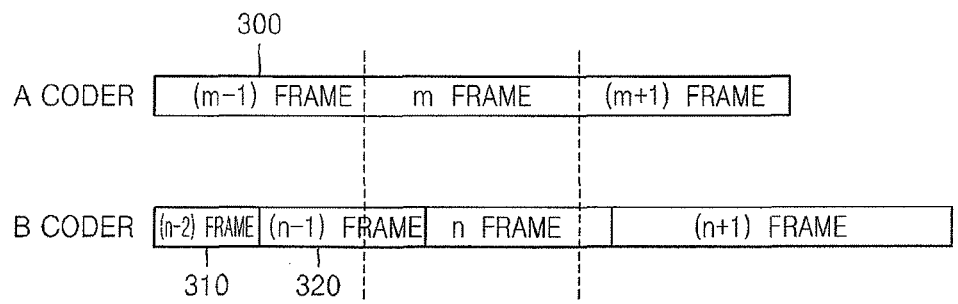
FIG. 3 is a conceptual view for explaining asynchronous time alignment.
Figure 4:
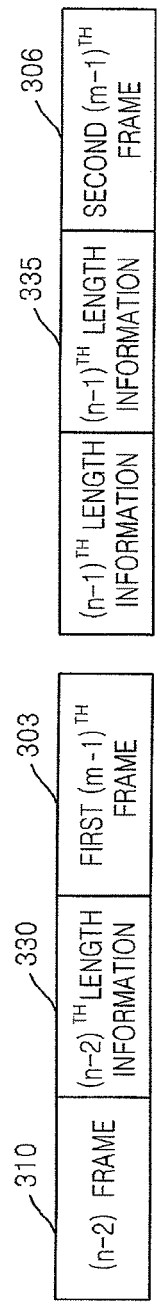
FIG. 4 is a conceptual view for explaining a conventional method and apparatus to multiplex bitstreams using asynchronous time alignment.
Figure 5:
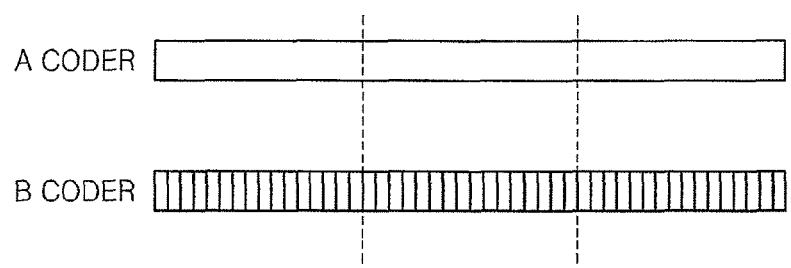
FIG. 5 is a conceptual view for explaining problems of the conventional method and apparatus to multiplex bitstreams using asynchronous time alignment.

Hereinafter, an exemplary embodiment of the present invention will be described in detail with reference to the accompanying drawings. It should be noted that like reference numerals refer to like elements illustrated in one or more of the drawings. In the following description of the present invention, a detailed description of known functions and configurations incorporated herein will be omitted for conciseness and clarity.

Figure 6:
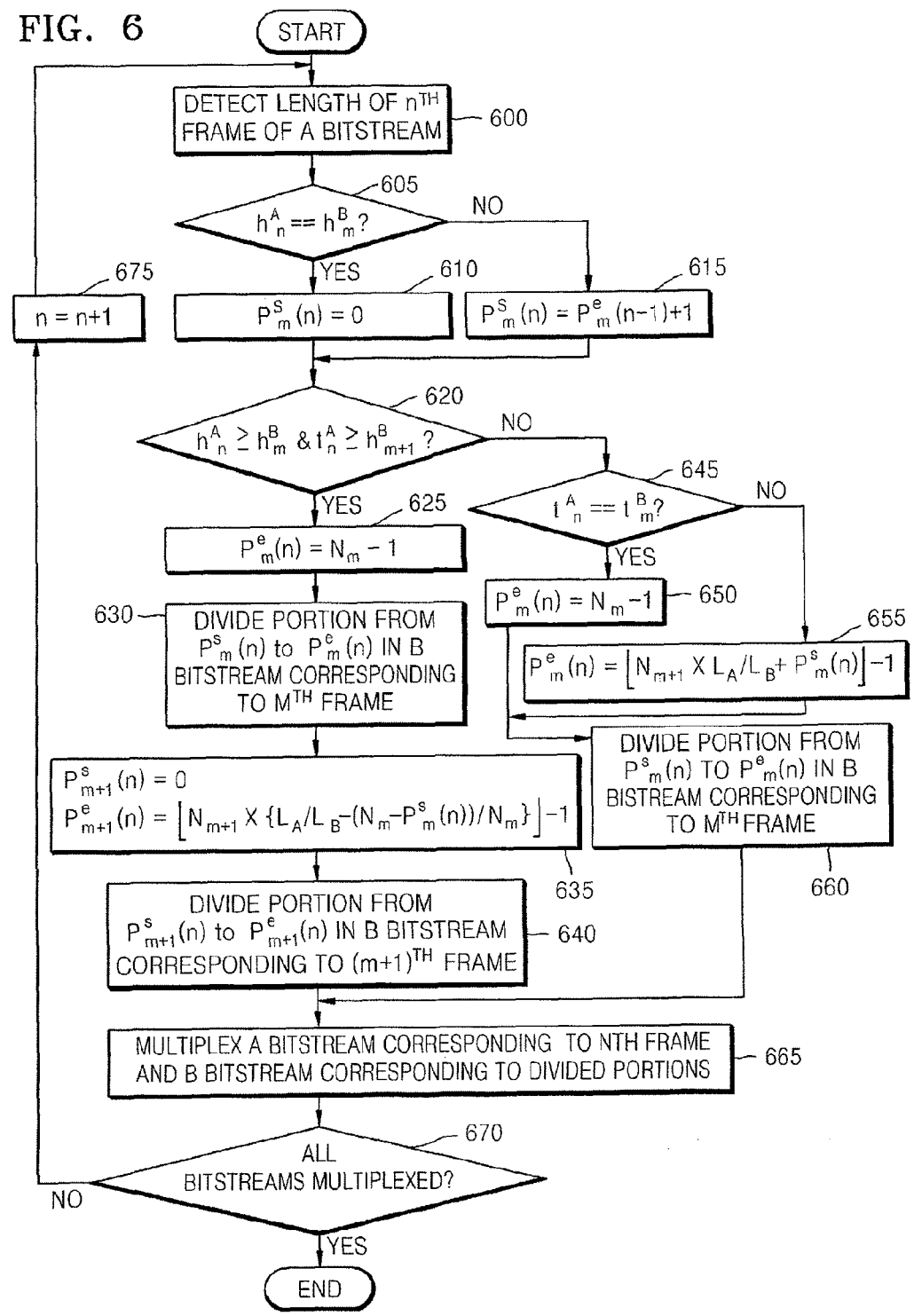
FIG. 6 is a flowchart of a method of multiplexing asynchronous bitstreams according to an exemplary embodiment of the present invention.

FIG. 6 is a flowchart of a method of multiplexing asynchronous bitstreams according to the present invention. A reference bitstream and a single bitstream coded to have different frame lengths by an A coder and a B coder instead of a plurality of coders are multiplexed in the current exemplary embodiment, but the present invention is not limited to this. Therefore, those of ordinary skill in the art may multiplex a reference bitstream and a plurality of bitstreams according to the current exemplary embodiment of the present invention.

Referring to FIG. 6, from between an A bitstream coded by an A coder and a B bitstream coded by a B coder, the length of an $n^{th}$ frame of the A bitstream that is selected as a reference bitstream is detected in operation 600. Preferably, a bitstream assigned the most bits or having the shortest frame length is selected as the reference bitstream.

In operation 605, it is determined whether the start point $h_n^A$ of the $n^{th}$ frame in the A bitstream is identical to the start point $h_m^B$ of an $m^{th}$ frame in the B bitstream.

If the two start points $h_n^A$ and $h_m^B$ are identical to each other, '0' is assigned to $p^s_m(n)$, that is a pointer indicating a start point for division in the A bitstream corresponding to the $n^{th}$ frame and the B bitstream corresponding to the $m^{th}$ frame to be multiplexed in operation 610.

If the two start points $h_n^A$ and $h_m^B$ are not identical to each other, a next value of $p^e_m(n-1)$, that is a pointer indicating an end point for division in the A bitstream corresponding to an $(n-1)^{th}$ frame of the A coder and in the multiplexed B bitstream corresponding to the $m^{th}$ frame of the B coder, is assigned to $p^s_m(n)$ in operation 615. In other words, in operation 615, '$p^e_m(n-1)+1$' is assigned to $p^s_m(n)$.

In operation 620 after operation 610 or 615, it is determined whether $h_n^A$ is greater than or equal to $h_m^B$ and whether $t_n^A$, that is the end point of the $n^{th}$ frame in the A bitstream, is greater than $h_{m+1}^B$, that is the start point of an $(m+1)^{th}$ frame in the B bitstream.

If so, a value obtained by subtracting 1 from $N_m$, that is the length of the B bitstream corresponding to the $m^{th}$ frame of the B coder, is assigned to $p^e_m(n)$, that is a pointer indicating an end point for division in the A bitstream corresponding to the $n^{th}$ frame and the B bitstream corresponding to the $m^{th}$ frame to be multiplexed, in operation 625.

In operation 630, a portion from $p^s_m(n)$ to $p^e_m(n)$ in the B bitstream corresponding to the $m^{th}$ frame is divided.

In operation 635, '0' is assigned to $p^s_{m+1}(n)$, that is a pointer indicating a start point for division in the A bitstream corresponding to the $n^{th}$ frame and the B bitstream corresponding to the $(m+1)^{th}$ frame to be multiplexed and '$\lfloor N_{m+1} * \{L^A_n/L^B_{m+1}-(N_m-P^s_m(n))/N_m\}\rfloor-1$' is assigned to $p^e_{m+1}(n)$, that is a pointer indicating an end point for division in the A bitstream corresponding to the $n^{th}$ frame and the B bitstream corresponding to the $(m+1)^{th}$ frame to be multiplexed. Here, $L_n^A$ indicates the length of the $n^{th}$ frame of the A coder and $L_{m+1}^B$ indicates the length of the $(m+1)^{th}$ frame of the B coder.

In operation 640, a portion from $p_{m+1}^s(n)$ to $p_{m+1}^e(n)$ in the B bitstream corresponding to the $(m+1)^{th}$ frame is divided.

In operation 665, the A bitstream corresponding to the $n^{th}$ frame and the portions of the B bitstream, which are divided in operations 630 and 640, are multiplexed. In multiplexing, it is desirable to arrange the B bitstream divided in operations 630 and 640 at the rear of the A bitstream corresponding to the $n^{th}$ frame. However, the B bitstream divided in operations 630 and 640 may also be positioned in front of the A bitstream corresponding to the $n^{th}$ frame.

If it is determined that $h_n^A$ is less than $h_m^B$ or $t_n^A$ is less than or equal to $h_{m+1}^B$ in operation 620, it is determined whether $t_n^A$ is equal to $t_m^B$, that is the end point of the $m^{th}$ frame in the B stream, in operation 645.

If it is determined that $t_n^A$ is equal to $t_m^B$ in operation 645, a value obtained by subtracting 1 from $N_m$ is assigned to $p_m^e(n)$ in operation 650.

If it is determined that $t_n^A$ is not equal to $t_m^B$ in operation 645, '$\lfloor N_{m+1} * L_n^A / L_{m+1}^B + P_m^s(n) \rfloor - 1$' is assigned to $p_m^e(n)$ in operation 655.

In operation 660, a portion from $p_m^s(n)$ to $p_m^e(n)$ in the B bitstream corresponding to the $m^{th}$ frame is divided.

In operation 665, the A bitstream corresponding to the $n^{th}$ frame and the portion of the B bitstream, which is divided in operation 660, are multiplexed. In multiplexing, it is desirable to arrange the B bitstream divided in operation 660 at the rear of the A bitstream corresponding to the $n^{th}$ frame. However, the B bitstream divided in operation 660 may also be positioned in front of the A bitstream corresponding to the $n^{th}$ frame.

In operation 670, it is determined whether all the bitstreams are multiplexed.

If it is determined that all the bitstreams are not multiplexed, '1' is added to 'n' in operation 675 and the process returns to operation 600.

Figure 7:
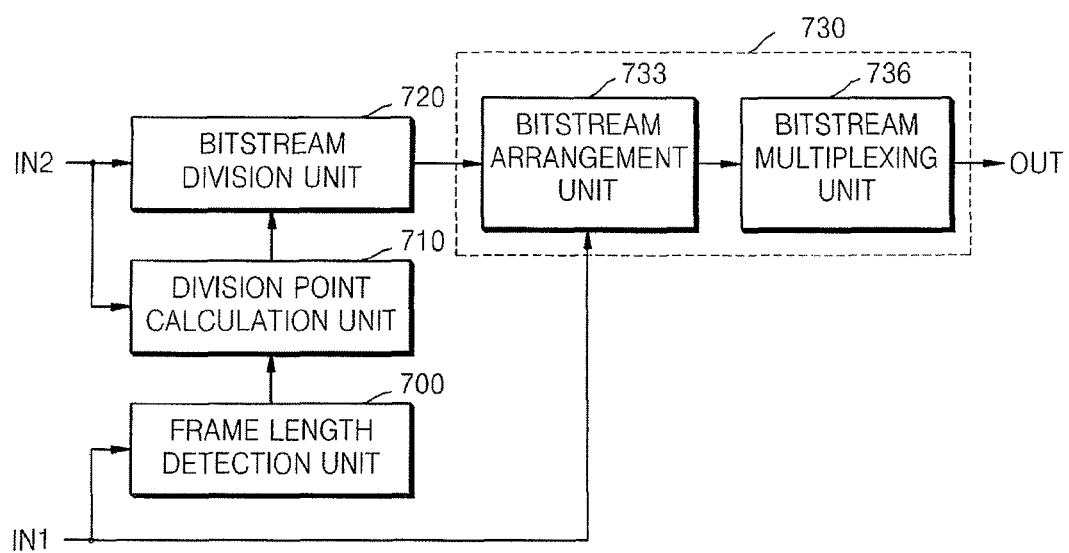
FIG. 7 is a block diagram of an apparatus to multiplex asynchronous bitstreams according to an exemplary embodiment of the present invention.

FIG. 7 is a block diagram of an apparatus to multiplex asynchronous bitstreams according to an exemplary embodiment of the present invention. Referring to FIG. 7, the apparatus includes a frame length detection unit 700, a division point calculation unit 710, a bitstream division unit 720, and a multiplexing unit 730. A reference bitstream and a single bitstream coded to have different frame lengths by an A coder and a B coder instead of a plurality of coders are multiplexed in the current exemplary embodiment, but the present invention is not limited to this. Therefore, those of ordinary skill in the art may multiplex a reference bitstream and a plurality of bitstreams according to the current exemplary embodiment of the present invention.

The frame length detection unit 700 detects the length of an $n^{th}$ frame of an A bitstream coded by the A coder, which is selected as a reference bitstream between the A bitstream and a B bitstream coded by the B coder. Preferably, a bitstream assigned the most bits or having the shortest frame length is selected as the reference bitstream.

Using the length of the $n^{th}$ frame of the A coder, detected by the frame length detection unit 700, the division point calculation unit 710 calculates a division point in the A bitstream corresponding to the $n^{th}$ frame and a B bitstream corresponding to an $m^{th}$ or $(m+1)^{th}$ frame of the B coder to be multiplexed. The division point calculation unit 710 calculates division points for the $n^{th}$ frame of the A bitstream and the $m^{th}$ or $(m+1)^{th}$ frame of the B bitstream in different ways as described below.

Figure 10:
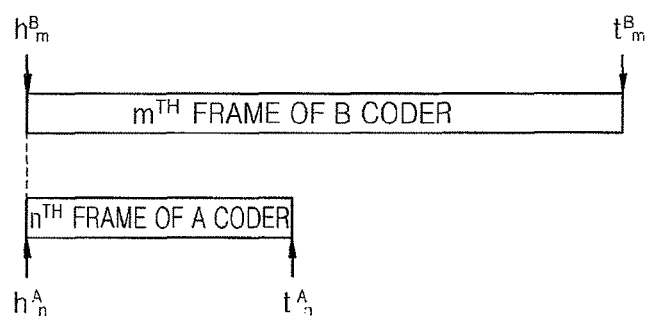
FIG. 10 is a conceptual view of an example in which $h_n^A$ is identical to $h_m^B$ and $t_n^A$ to is positioned between $h_m^B$ and $t_m^B$.

First, when the start point $h_n^A$ of the $n^{th}$ frame in the A bitstream is identical to the start point $h_m^B$ of the $m^{th}$ frame in the B bitstream and $t_n^A$, that is the end point of the $n^{th}$ frame in the A bitstream, is positioned between $h_m^B$ and $t_m^B$, that is the end point of the $m^{th}$ frame in the B stream, as illustrated in FIG. 10, the division point in the B bitstream corresponding to the $m^{th}$ frame is calculated as follows:

$$p_m^s(n)=0$$

$$p_m^e(n)=\lfloor N_m \times L_n^A / L_m^B \rfloor - 1 \quad (1),$$

where $p_m^s(n)$ is a pointer indicating a start point for division in the A bitstream corresponding to the $n^{th}$ frame and the B bitstream corresponding to the $m^{th}$ frame to be multiplexed, $p_m^e(n)$ is a pointer indicating an end point for division in the A bitstream corresponding to the $n^{th}$ frame and the B bitstream corresponding to the $m^{th}$ frame to be multiplexed, $N_m$ is the length of the B bitstream corresponding to the $m^{th}$ frame, $L_n^A$ is the length of the $n^{th}$ frame of the A coder, and $L_m^B$ is the length of the $m^{th}$ frame of the B coder.

Figure 11:
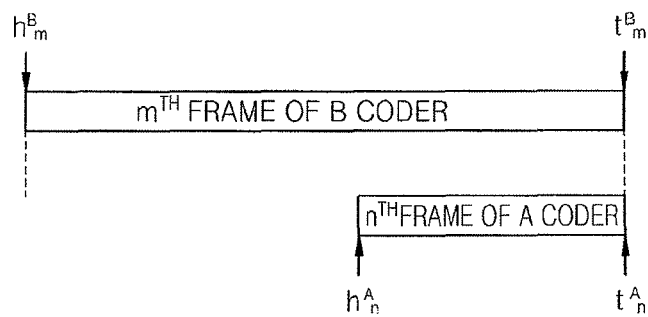
FIG. 11 is a conceptual view of an example in which $t_n^A$ to is identical to $t_m^B$ and $h_n^A$ is positioned between $h_m^B$ and $t_m^B$.

Second, when $t_n^A$ is identical to $t_m^B$ and $h_n^A$ is positioned between $h_m^B$ and $t_m^B$, as illustrated in FIG. 11, the division point in the B bitstream corresponding to the $m^{th}$ frame is calculated as follows:

$$p_m^s(n)=p_{n-1}^e+1$$

$$p_m^e(n)=N_m-1 \quad (2),$$

where $p_m^s(n)$ is a pointer indicating a start point for division in the A bitstream corresponding to the $n^{th}$ frame and the B bitstream corresponding to the $m^{th}$ frame to be multiplexed, $p_m^e(n)$ is a pointer indicating an end point for division in the A bitstream corresponding to the $n^{th}$ frame and the B bitstream corresponding to the $m^{th}$ frame to be multiplexed, $p_m^e(n-1)$ is a pointer indicating an end point for division in an A bitstream corresponding to an $(n+1)^{th}$ frame and the B bitstream corresponding to the $m^{th}$ frame to be multiplexed, and $N_m$ is the length of the B bitstream corresponding to the $m^{th}$ frame.

Figure 12:
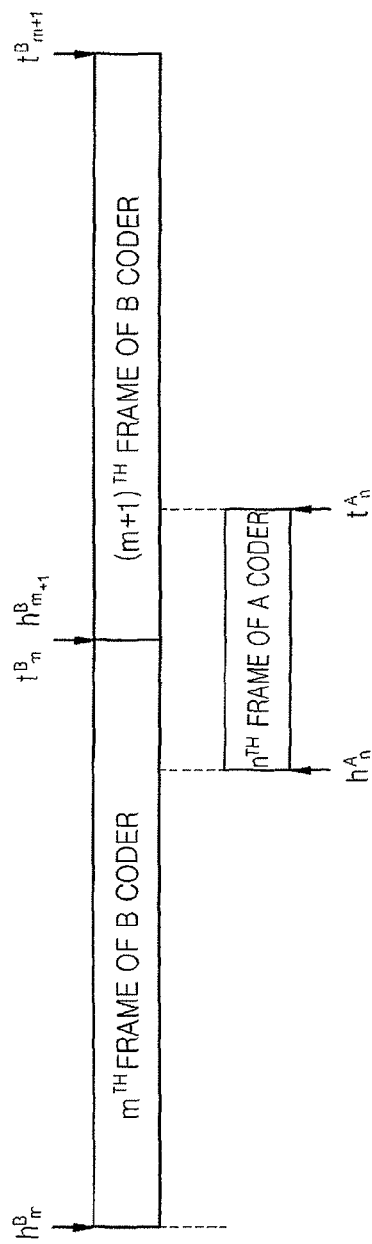
FIG. 12 is a conceptual view of an example in which $h_n^A$ is positioned between $h_m^B$ and $t_m^B$, and $t_n^A$ to is positioned between $h_{m+1}^B$ and $t_{m+1}^B$.

Third, when the A bitstream corresponding to the $n^{th}$ frame extends over both the $m^{th}$ frame and the $(m+1)^{th}$ frame of the B bitstream, as illustrated in FIG. 12, i.e., $h_n^A$ is positioned between $h_m^B$ and $t_m^B$ and $t_n^A$ is positioned between $h_{m+1}^B$ and $t_{m+1}^B$, a division point in the B bitstream corresponding to the $m^{th}$ frame and the $(m+1)^{th}$ frame is calculated as follows:

$$p_m^s(n)=p_m^e(n-1)+1$$

$$p_m^e(n)=N_m-1$$

$$p_{m+1}^s(n)=0$$

$$p_{m+1}^e(n)=\lfloor N_{m+1} \times (L_n^A / L_m^B - (N_m - p_m^s(n))/N_m) \rfloor - 1 \quad (3),$$

where $p_m^s(n)$ is a pointer indicating a start point for division in the A bitstream corresponding to the $n^{th}$ frame and the B bitstream corresponding to the $m^{th}$ frame to be multiplexed, $p_m^e(n)$ is a pointer indicating an end point for division in the A bitstream corresponding to the $n^{th}$ frame and the B bitstream corresponding to the $m^{th}$ frame to be multiplexed, $p_{m+1}^s(n)$ is a pointer indicating a start point for division in the A bitstream corresponding to the $n^{th}$ frame and the B bitstream corresponding to the $(m+1)^{th}$ frame to be multiplexed, $p_{m+1}^e(n)$ is a pointer indicating an end point for division in the A bitstream corresponding to the $n^{th}$ frame and the B bitstream corresponding to the $(m+1)^{th}$ frame to be multiplexed, $p_m^e(n-1)$ is a pointer indicating an end point for division in an A bitstream corresponding to an $(n+1)^{th}$ frame and the B bitstream corresponding to the $m^{th}$ frame to be multiplexed, $N_m$ is the length of the B bitstream of the $m^{th}$ frame, $N_{m+1}$ is the length of the B bitstream corresponding to the $(m+1)^{th}$ frame, $L^A_n$ is the length of the $n^{th}$ frame of the A coder, and $L^B_m$ is the length of the $m^{th}$ frame of the B coder.

Figure 13:
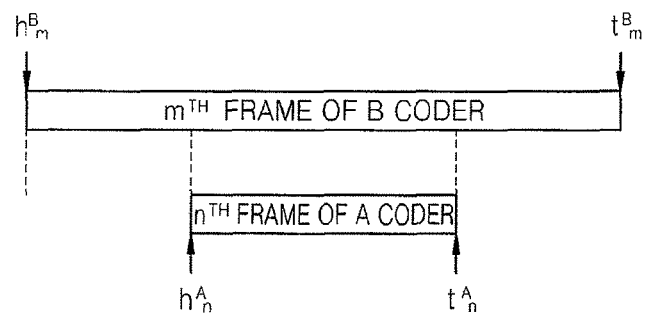
FIG. 13 is a conceptual view of an example in which $h_n^A$ is positioned behind $h_m^B$, and $t_n^A$ is positioned ahead of $t_m^B$.

Fourth, when the A bitstream corresponding to the $n^{th}$ frame is included in the $m^{th}$ frame of the B bitstream, as illustrated in FIG. 13, i.e., $h_n^A$ is positioned behind $h_m^B$ and $t_n^A$ is positioned ahead of $t_m^B$, a division point in the B bitstream corresponding to the $m^{th}$ frame is calculated as follows:

$$p^s_m(n) = p^e_m(n-1) + 1$$

$$p^e_m(n) = \lfloor N_m \times L^A_n / L^B_m + p^s_m(n) \rfloor - 1 \quad (4),$$

where $p^s_m(n)$ is a pointer indicating a start point for division in the A bitstream corresponding to the $n^{th}$ frame and the B bitstream corresponding to the $m^{th}$ frame to be multiplexed, $p^e_m(n)$ is a pointer indicating an end point for division in the A bitstream corresponding to the $n^{th}$ frame and the B bitstream corresponding to the $m^{th}$ frame to be multiplexed, $p^e_m(n-1)$ is a pointer indicating an end point for division in an A bitstream corresponding to an $(n+1)^{th}$ frame and the B bitstream corresponding to the $m^{th}$ frame to be multiplexed, $N_m$ is the length of the B bitstream of the $m^{th}$ frame, $N_{m+1}$ is the length of the B bitstream corresponding to the $(m+1)^{th}$ frame, $L^A_n$ is the length of the $n^{th}$ frame of the A coder, and $L^B_m$ is the length of the $m^{th}$ frame of the B coder.

Figure 14:
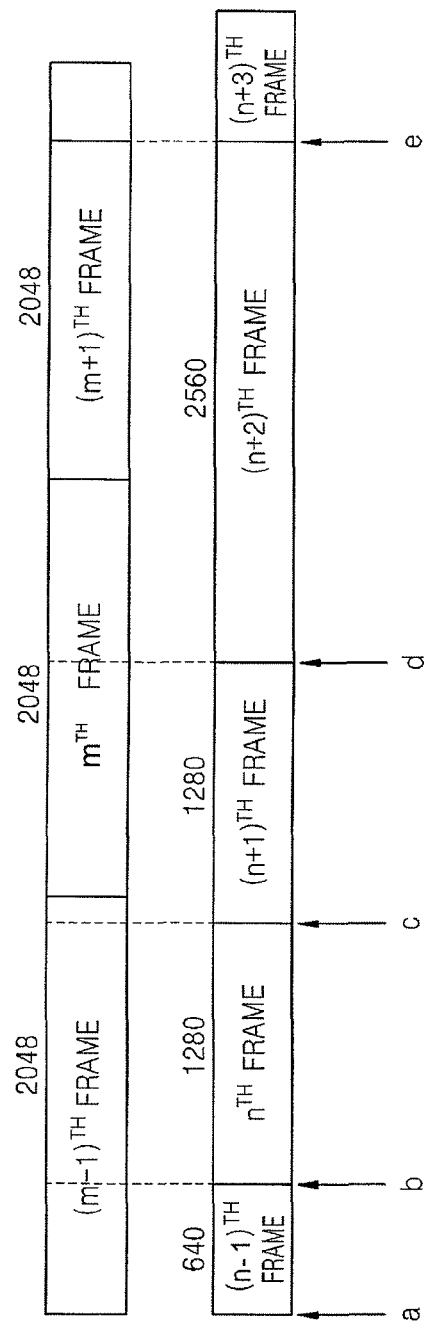
FIG. 14 is a conceptual view of an example in which a data size for dividing the remaining bitstreams except for a reference bitstream is calculated by a method and apparatus to multiplex asynchronous bitstreams according to an exemplary embodiment of the present invention.

The calculation of the division point by the division point calculation unit 710 using the above-described equations may be described with reference to FIG. 14.

First, a point 'a' is a start point and thus '0' is assigned to 'a'.

Next, at a point 'b', the division point calculation unit 710 calculates the point 'b' using Equation 4 because the A bitstream corresponding to the $(n-1)^{th}$ frame is positioned at a location in the B bitstream corresponding to the $(m-1)^{th}$ frame. By substituting the length of the $(n-1)^{th}$ frame of the A bitstream, i.e., '640', the length of the $(m-1)^{th}$ frame of the B bitstream, i.e., '2048', and the length of the B bitstream corresponding to the $(m-1)^{th}$ frame, i.e., $N_{m-1}$, into Equation 4, 'b' is assigned $$\cdot \left\lfloor N_{m-1} \frac{640}{2048} \right\rfloor - 1 \text{'}.$$

At a point 'c', the division point calculation unit 710 calculates the point 'c' using Equation 4 because the A bitstream corresponding to the $n^{th}$ frame is positioned at a location in the B bitstream corresponding to the $(m-1)^{th}$ frame. By substituting the length of the $n^{th}$ frame of the A bitstream, i.e., '1280', the length of the $(m-1)^{th}$ frame of the B bitstream, i.e., '2048', and the length of the B bitstream corresponding to the $(m-1)^{th}$ frame, i.e., $N_{m-1}$, into Equation 4, 'c' is assigned $$\cdot \left\lfloor N_{m-1} \frac{1280}{2048} + b + 1 \right\rfloor - 1 \text{'}.$$

At a point 'd', the division point calculation unit 710 calculates the point 'd' using Equation 3 because the A bitstream corresponding to an $(n+1)^{th}$ frame extends over both the $(m-1)^{th}$ frame and the $m^{th}$ frame of the B bitstream. By substituting the length of the $(n+1)^{th}$ frame of the A bitstream, i.e., '1280', the length of the $(m-1)^{th}$ frame of the B bitstream, i.e., '2048', the length of the B bitstream corresponding to the $(m-1)^{th}$ frame, i.e., $N_{m-1}$, and the length of the B bitstream corresponding to the $m^{th}$ frame, i.e., $N_m$, into Equation 3, 'd' is assigned $$\cdot \left\lfloor N_m \left( \frac{1280}{2048} - \frac{N_{m-1} - c - 1}{N_{m-1}} \right) \right\rfloor - 1 \text{'}.$$

At a point 'e', the division point calculation unit 710 calculates the point 'e' using Equation 3 because the A bitstream corresponding to an $(n+2)^{th}$ frame extends over both the $m^{th}$ frame and the $(m+1)^{th}$ frame of the B bitstream. By substituting the length of the $(n+2)^{th}$ frame of the A bitstream, i.e., '2560', the length of the $m^{th}$ frame of the B bitstream, i.e., '2048', the length of the B bitstream corresponding to the $m^{th}$ frame, i.e., $N_m$, and the length of the B bitstream corresponding to the $(m+1)^{th}$ frame, i.e., $N_{(m+1)}$, into Equation 3, 'e' is assigned $$\cdot \left\lfloor N_{m+1} \left( \frac{2560}{2048} - \frac{N_m - d - 1}{N_m} \right) \right\rfloor - 1 \text{'}.$$

The bitstream division unit 720 divides the B bitstream at the division point calculated by the division point calculation unit 710. In the first, second and fourth cases, only a center portion of the $m^{th}$ frame in the B bitstream is divided. However, in the third case, corresponding portions of both $m^{th}$ frame and the $(m+1)^{th}$ frame in the B bitstream are divided. In other words, only a portion from $p^s_m(n)$ to $p^e_m(n)$ in the B bitstream is divided in the first, second, and fourth cases, but a portion from $p^s_m(n)$ to $p^e_m(n)$ in the B bitstream and a portion from $p^s_{m+1}(n)$ to $p^e_{m+1}(n)$ in the B bitstream are divided in the third case.

The multiplexing unit 730 multiplexes the A bitstream corresponding to the $n^{th}$ frame and the B bitstream(s) corresponding to the $m^{th}$ frame or the $(m+1)^{th}$ frame divided by the bitstream division unit 720. The multiplexing unit 730 includes a bitstream arrangement unit 733 and a bitstream multiplexing unit 736.

The bitstream arrangement unit 733 arranges the A bitstream corresponding to the $n^{th}$ frame and the B bitstream(s) corresponding to the $m^{th}$ frame or the $(m+1)^{th}$ frame divided by the bitstream division unit 720. Preferably, the bitstream arrangement unit 733 arranges the divided B bitstream(s) at the rear of the A bitstream corresponding to the $n^{th}$ frame. However, the bitstream arrangement unit 733 may also arrange the divided B bitstream(s) in front of the A bitstream corresponding to the $n^{th}$ frame.

The bitstream multiplexing unit 736 multiplexes the bitstreams arranged by the bitstream arrangement unit 733 and outputs the multiplexed bitstreams as a stream through an output terminal OUT.

Figure 8:
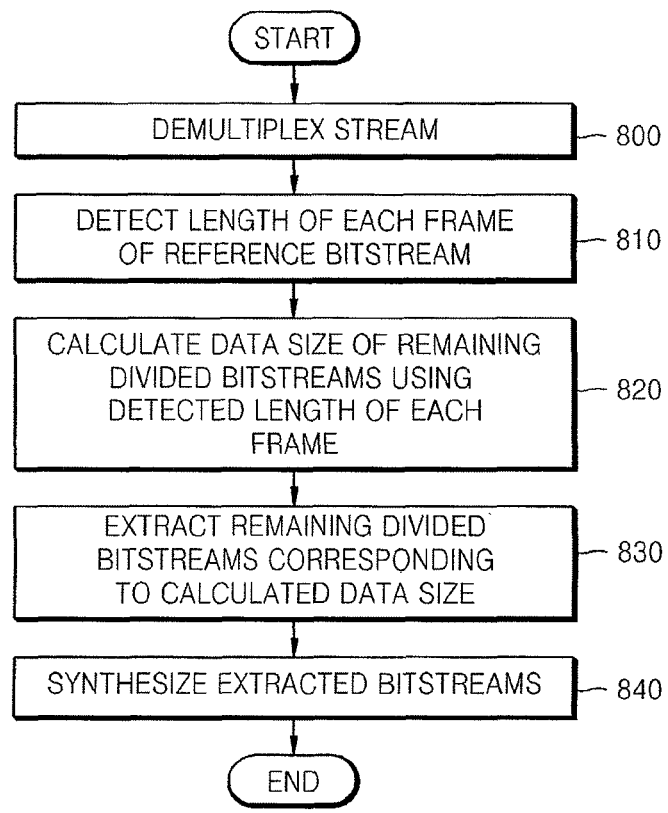
FIG. 8 is a flowchart of a method of demultiplexing asynchronous bitstreams according to an exemplary embodiment of the present invention.

FIG. 8 is a flowchart of a method of demultiplexing asynchronous bitstreams according to an exemplary embodiment of the present invention.

Referring to FIG. 8, in operation 800, a stream generated by multiplexing bitstreams coded to have different frame lengths by a plurality of coders is input and demultiplexed. The input stream does not include information about the data size of each of at least one bitstream obtained by dividing the remaining bitstreams except for a reference bitstream at the coding end.

In operation 810, the length of each frame of a bitstream selected as a reference bitstream from among the demultiplexed bitstreams is detected. Preferably, a bitstream assigned the most bits or having the shortest frame length is selected as the reference bitstream.

In operation 820, the data size of each of bitstreams obtained by dividing the remaining bitstreams except for the reference bitstream is calculated using the detected length of each frame.

In operation 830, the bitstreams corresponding to the calculated size are extracted from the demultiplexed bitstreams.

In operation 840, the extracted bitstreams are synthesized.

Figure 9:
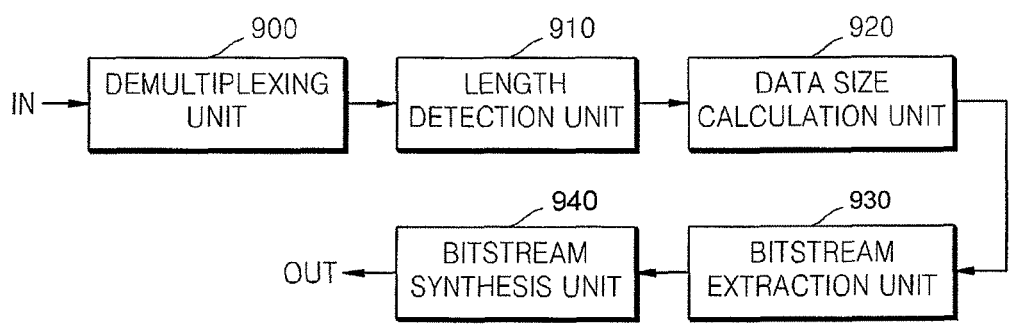
FIG. 9 is a block diagram of an apparatus to demultiplex asynchronous bitstreams according to an exemplary embodiment of the present invention.

FIG. 9 is a block diagram of an apparatus to demultiplex asynchronous bitstreams according to an exemplary embodiment of the present invention. Referring to FIG. 9, the apparatus includes a demultiplexing unit 900, a length detection unit 910, a data size calculation unit 920, a bitstream extraction unit 930, and a bitstream synthesis unit 940.

The demultiplexing unit 900 receives a stream generated by multiplexing bitstreams coded to have different frame lengths by a plurality of coders at the coding end through an input terminal IN and demultiplexes the received stream. The stream input by the demultiplexing unit 900 does not include information related to the data size of each bitstream obtained by dividing the remaining bitstreams except for the reference bitstream.

The length detection unit 910 detects the length of each frame of a bitstream selected as a reference bitstream from among the bitstreams demultiplexed by the demultiplexing unit 900. Preferably, a bitstream assigned the most bits or having the shortest frame length is selected as the reference bitstream.

The data size calculation unit 920 calculates the data size of each bitstream obtained by dividing the remaining bitstreams except for the reference bitstream using the length of each frame detected by the length detection unit 910.

The bitstream extraction unit 930 extracts the bitstreams corresponding to the data size calculated by the data size calculation unit 920 from the bitstreams demultiplexed by the demultiplexing unit 900.

The bitstream synthesis unit 940 synthesizes the bitstreams extracted by the bitstream extraction unit 930 and outputs the synthesized bitstreams through an output terminal OUT.

As described above, according to the present invention, based on the length of each frame of a bitstream selected as a reference bitstream from among bitstreams coded to have different frame lengths by a plurality of coders, the remaining bitstreams are divided and multiplexed.

By doing so, it is not necessary for a coding end to generate and transmit information about the data size of each bitstream obtained by dividing the remaining bitstreams except for the reference bitstream, thereby reducing the complexity of and the time required for a coding process and reducing the size of data to be transmitted from the coding end to a decoding end. Moreover, the decoding end can demultiplex and decode the remaining bitstreams without information about the data size of each bitstream obtained by dividing the remaining bitstreams. Therefore, the coding end and the decoding end can accurately and efficiently control a bitrate.

Furthermore, the coding end can efficiently divide the remaining bitstreams based on the reference bitstream and transmit the divided bitstreams to the decoding end, thereby improving sound quality or display quality.

Meanwhile, the present invention can be embodied as code that is readable by a computer on a computer-readable recording medium. The computer-readable recording medium includes all kinds of recording devices storing data that is readable by a computer system. Examples of the computer-readable recording medium include read-only memory (ROM), random access memory (RAM), CD-ROMs, magnetic tapes, floppy disks, optical data storage devices, and carrier waves such as transmission over the Internet.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A method of multiplexing asynchronous bitstreams, the method comprising:
   Detecting, by using at least one processing device, the length of each frame of a bitstream selected as a reference bitstream from among bitstreams that are coded to have different frame lengths by a plurality of coders;
   dividing the remaining bitstreams except for the reference bitstream based on the detected length of each frame;
   arranging the divided bitstreams corresponding to each frame of the reference bitstream in front of or at the rear of the reference bitstream corresponding to each frame; and
   multiplexing the reference bitstream and the divided bitstreams without incorporating information related to the data size of the divided bitstreams.

2. The method of claim 1, wherein the division of the remaining bitstreams comprises:
   calculating a division point in the remaining bitstreams using the detected length of each frame; and
   dividing the remaining bitstreams at the calculated division point.

3. The method of claim 1, wherein a bitstream assigned the most bits is selected as the reference bitstream.

4. The method of claim 1, wherein a bitstream having the shortest frame length is selected as the reference bitstream.

5. A method of demultiplexing asynchronous bitstreams, the method comprising:
   demultiplexing a stream generated by multiplexing bitstreams that are coded to have different frame lengths by a plurality of coders;
   detecting, by using at least one processing device, the length of each frame of a bitstream selected as a reference bitstream in the demultiplexed stream;
   extracting the remaining divided bitstreams except for the reference bitstream using the detected length of each frame of the reference bitstream without incorporating information related to the data size of the divided bitstreams, and
   synthesizing the divided bitstreams corresponding to each frame of the reference bitstream in front of or at rear of the reference bitstream corresponding to each frame.

6. The method of claim 5, wherein the extraction of the remaining divided bitstreams comprises:
   calculating the data size of the remaining divided bitstreams using the detected length of each frame; and
   extracting the remaining divided bitstreams corresponding to the calculated data size.

7. The method of claim 5, wherein a bitstream assigned the most bits is selected as the reference bitstream.

8. The method of claim 5, wherein a bitstream having the shortest frame length is selected as the reference bitstream.

9. A non-transitory computer-readable recording medium having recorded thereon a program for executing a method of multiplexing asynchronous bitstreams, the method comprising:

detecting the length of each frame of a bitstream selected as a reference bitstream from among bitstreams that are coded to have different frame lengths by a plurality of coders;

dividing the remaining bitstreams except for the reference bitstream based on the detected length of each frame;

arranging the divided bitstreams corresponding to each frame of the reference bitstream in front of or at the rear of the reference bitstream corresponding to each frame; and multiplexing the reference bitstream and the divided bitstreams without incorporating information related to the data size of the divided bitstreams.

10. A non-transitory computer-readable recording medium having recorded thereon a program for executing a method of demultiplexing asynchronous bitstreams, the method comprising:

demultiplexing a stream generated by multiplexing bitstreams that are coded to have different frame lengths by a plurality of coders;

detecting the length of each frame of a bitstream selected as a reference bitstream in the demultiplexed stream; and extracting the remaining divided bitstreams except for the reference bitstream using the detected length of each frame of the reference bitstream without incorporating information related to the data size of the divided bitstreams, and synthesizing the divided bitstreams corresponding to each frame of the reference bitstream in front of or at the rear of the reference bitstream corresponding to each frame.

11. An apparatus for multiplexing asynchronous bitstreams, the apparatus comprising:

a frame length detection unit, implemented by using at least one processing device to detect the length of each frame of a bitstream selected as a reference bitstream from among bitstreams that are coded to have different frame lengths by a plurality of coders;

a division unit to divide the remaining bitstreams except for the reference bitstream based on the detected length of each frame;

a bitstream arrangement unit arranging the divided bitstreams corresponding to each frame of the reference bitstream in front of or at the rear of the reference bitstream corresponding to each frame; and a multiplexing unit to multiplex the reference bitstream and the divided bitstreams without incorporating information related to the data size of the divided bitstreams.

12. The apparatus of claim 11, wherein the division unit comprises:

a division point calculation unit to calculate a division point in the remaining bitstreams using the detected length of each frame; and a bitstream division unit to divide the remaining bitstreams at the calculated division point.

13. The apparatus of claim 11, wherein a bitstream assigned the most bits is selected as the reference bitstream.

14. The apparatus of claim 11, wherein a bitstream having the shortest frame length is selected as the reference bitstream.

15. An apparatus for demultiplexing asynchronous bitstreams, the apparatus comprising:

a demultiplexing unit to demultiplex stream generated by multiplexing bitstreams that are coded to have different frame lengths by a plurality of coders;

a length detection unit, implemented by using at least one processing device to detect the length of each frame of a bitstream selected as a reference bitstream in the demultiplexed stream; and an extraction unit to extract the remaining divided bitstreams except for the reference bitstream using the detected length of each frame of the reference bitstream without incorporating information related to the data size of the divided bitstreams, and a bitstream synthesis unit to synthesize the divided bitstreams corresponding to each frame of the reference bitstream in front of or at the rear of the reference bitstream corresponding to each frame.

16. The apparatus of claim 15, wherein the extraction unit comprises:

a data size calculation unit to calculate the data size of the remaining divided bitstreams using the detected length of each frame; and a bitstream extraction unit to extract the remaining divided bitstreams corresponding to the calculated data size.

17. The apparatus of claim 15, wherein a bitstream assigned the most bits is selected as the reference bitstream.

18. The apparatus of claim 15, wherein a bitstream having the shortest frame length is selected as the reference bitstream.

* * * * *